July 3, 1951

W. C. DOUCE 2,559,285

CATALYTIC CRACKING AND DESTRUCTIVE HYDROGENATION
OF HEAVY ASPHALTIC OILS
Filed Jan. 2, 1948

INVENTOR.
W. C. DOUCE

BY Hudson and Young

ATTORNEYS

Patented July 3, 1951

2,559,285

UNITED STATES PATENT OFFICE 2,559,285

CATALYTIC CRACKING AND DESTRUCTIVE HYDROGENATION OF HEAVY ASPHALTIC OILS

William C. Douce, Bartlesville, Okla., assignor to Phillips Petroleum Company, a corporation of Delaware Application January 2, 1948, Serial No. 319

1 Claim. (Cl. 196—14.11)

This invention relates to a process for treating hydrocarbons. In one of its more specific aspects, it relates to a process for upgrading asphaltic residues and heavy oils. In a preferred embodiment, this invention relates to a combination process for upgrading asphaltic residues and heavy oils by hydrogenolysis and cracking.

All crude oils as they come from the oil fields contain varying amounts of dirt and other impurities. In addition, these oils contain tars and asphaltic materials, comprising a high percentage of condensation products and carbon. It has now become necessary to utilize heavy oils such as topped crude to obtain maximum gasoline and distillate yields. Before it is economical to catalytically crack these oils, the dirt, tars, and other impurities must be removed, otherwise premature deactivation of the catalyst will take place due to excessive carbon deposition. One of the methods being used to clean up these heavy oils, preparatory to catalytic cracking, is propane treating. The dirty asphaltic residue obtained is of low value and may be used as fuel oil, road material, or processed into coke.

Efforts have been made to upgrade these residues into products of greater value such as gasoline and gas oils to help meet the ever increasing demand for such materials. One such method is high pressure hydrogenolysis or destructive hydrogenation. It is desirable to operate a hydrogenolysis process in such a manner that the gasoline and gas oil produced are of improved quality and the carbon deposition on the catalyst is kept at a minimum.

In processes wherein heavy oils, such as gas oils, are catalytically cracked, there is often a heavy oil residue obtained which is more refractory than the charged oil and which contains tar forming materials that increase carbon formation on the catalyst when the oil is recycled to the catalyst chambers. In addition, when an oil such as this is cracked, the product contains more gas and less gasoline, the gasoline also being of poorer quality. To utilize these heavy oils effectively in catalytic cracking processes, they must be treated so that the catalysts will not become prematurely deactivated by the carbon deposition.

In this specification the term "topped crude" refers to a crude oil which has had the materials boiling below about 800° F. removed by a suitable separation process. One method for producing topped crude is to pass a natural crude as it comes from the pipeline through preheaters, taking care not to heat the oil enough to cause cracking, and then fractionating off the gases, gasoline, and a portion of the gas oil. The residue from this fractionation step is passed to a vacuum fractionation unit where more gas oil is removed. In this instance, the oil is vacuum fractionated to give a residue with an initial boiling point of 800° F. The residue from this step is referred to as topped crude.

A refractory gas oil as referred to herein is a heavy oil residue from a catalytic cracking process which is difficult to upgrade by catalytic means. Such an oil usually contains large quantities of aromatics and tar forming materials. This type of oil if passed through a catalytic cracking process, will form excessive coke and carbonaceous deposits on the catalyst prematurely deactivating same.

An object of this invention is to provide a process for treating hydrocarbons. Another object is to upgrade asphaltic residues. A further object is to upgrade heavy oils. Another object is to provide a combination process for upgrading asphaltic residue from propane deasphalting of topped crude and heavy refractory oil from catalytic cracking of deasphalted topped crude. Another object is to provide a combination process for manufacturing high grade cracking stock from asphaltic residues and heavy oils. A further object is to provide a combination process for manufacturing high grade cracking stock from asphaltic residue obtained by propane deasphalting of topped crude, and from heavy gas oil resulting from catalytic cracking of deasphalted topped crude. Other objects and advantages of this invention will be apparent to one skilled in the art from the accompanying disclosure and discussion.

I have discovered a combination process whereby asphaltic residue obtained by the propane deasphalting of topped crude and heavy refractory oil from the catalytic cracking of heavy oil may be treated giving maximum yields of gasoline range hydrocarbons and gas oil suitable for Diesel fuel and cracking stock.

In a preferred embodiment of my invention topped crude is passed to a propane deasphalting unit which separates a heavy clean oil from dirt, tars, and asphaltic constituents inherently found in natural crude oil. The clean heavy oil is catalytically cracked along with a clean virgin gas oil, if desired, which may be obtained when the natural crude oil is topped. Gas, gasoline, light gas oil and a refractory heavy gas oil are obtained as products of this treatment. The heavy refractory gas oil along with asphaltic residue from the propane deasphalting step is destructively hydrogenated in a hydrogenolysis unit, upgrading these materials by cracking and hydrogenating to produce an improved catalytic cracking charge stock as one of the products. In addition to the heavy gas oil being a reactant in the hydrogenolysis unit, it also acts as a diluent for the asphalt, aiding in minimizing the carbon deposition on the catalyst and in the handling of the asphalt. The total hydrogenolysis effluent comprises light gases, naphtha, clean gas oil, and residue. The clean gas oil which has been produced as an improved cracking stock by decyclizing and forming a greater quantity of saturated paraffins, is further treated along with the clean heavy oil from the propane deasphalting unit and the clean virgin gas oil thus increasing the volume of cracked products available from a crude oil. As an alternative, the improved gas oil may be thermally cracked, if desired. The naphtha portion of the hydrogenolysis effluent is reformed, either thermally or catalytically to produce gas, gasoline, and gas oil, thus still further increasing the total volume of useful products which may be derived from a crude oil. The hydrogenolysis residue is recycled to the hydrogenolysis unit for further treatment.

Under certain circumstances it may be desirable to employ an alternative method for treating the hydrogenolysis effluent boiling above the naphtha range. If so, it may be recycled in toto to the propane deasphalting step for treatment as described above.

A further understanding of some of the specific aspects of my invention may be had by referring to the accompanying drawing, which is a schematic flow diagram showing one arrangement of apparatus elements and flow of materials therethrough suitable for the practice of my invention. Various additional valves, pumps, and other conventional equipment necessary for the practice of this invention will be familiar to one skilled in the art and have been omitted from this drawing for the sake of clarity.

In the drawing, heavy oil such as topped Kansas crude boiling above about 800° F. is charged to propane deasphalting unit 10 through line 11, and propane is charged through line 12. The heavy oil is contacted countercurrently with propane in liquid phase at a temperature in the range of 130 to 190° F. A mixture of clean heavy oil and propane is removed from unit 10 through line 13 to propane separator 14 from which propane is removed in known manner through line 15 and recycled through line 12 to deasphalting unit 10. Clean oil from separator 14 boiling in a range of 800 to 1000° F. is passed through line 16 to catalytic cracking unit 18, with or without clean virgin gas oil boiling in a range of 550 to 800° F. introduced via line 17 and which may be obtained, by means not shown, when the natural crude oil is topped. The oil is passed in contact with a suitable cracking catalyst such as bauxite, montmorillonite, a bentonitic clay, or synthetic silica-alumina, at a temperature in the range of 850 to 950° F. (or higher in the case of bauxite), a pressure in the range of 0 to 100 pounds per square inch, and in the case of a moving bed process, a catalyst to oil ratio in the range of 3:1 to 10:1. The type of catalytic cracking process used in this invention is not to be limited by the process discussed in connection with the drawing, because, for example, a fixed bed process will work equally as well. Gas, gasoline, and light gas oil are removed from cracking unit 18 through lines 19, 20, and 21, respectively. Heavy refractory gas oil boiling in a range of 600 to 850° F. is removed through line 22. The light gas oil may be used as Diesel fuel or a suitable charge stock for further catalytic cracking. Asphaltic residue from propane deasphalting unit 10 boiling above 1000° F. is removed through line 23 to hydrogenolysis unit 24 where it is destructively hydrogenated. In addition, fresh and/or recycle hydrogen is introduced through line 26, and heavy refractory gas oil from catalytic cracking unit 18 is introduced through line 22. This oil is both a reactant, and a diluent for the heavy asphaltic material, thus making it more easily handled and reducing the carbon deposition on the catalyst. The hydrogenolysis step is carried out over a catalyst resistant to poisoning by sulfur such as the sulfides and oxides of molybdenum and tungsten. Suitable operating conditions are: a temperature in the range of 800 to 950° F., a pressure in the range of 1500 to 5000 pounds per square inch, and a liquid space velocity of 0.5 to 2.5 volumes of charge per volume of catalyst per hour. Hydrogen consumption is in the range of 2000 to 3000 cubic feet per barrel of charge. In addition to destructively hydrogenating the asphalt and heavy gas oil, sulfur is removed to the extent of 65 to 95 weight per cent of the total sulfur present. Effluent from hydrogenolysis unit 24 is passed through line 28 to fractionation unit 29 where hydrogen, $C_1$ to $C_4$ hydrocarbons, naphtha boiling in a range of $C_5$ to 550° F., and residue boiling above 550° F. are separated and removed through lines 30, 27, 31, and 37, respectively. The naphtha fraction which is suitable for thermal or catalytic reforming, is passed to reforming unit 32. Here, for example, it is thermally reformed at a temperature of 950 to 1150° F. and a pressure of 1000 to 1500 pounds per square inch, producing materials such as gas, gasoline, and gas oil which are removed through lines 33, 34, and 36, respectively. The material boiling above about 550° F. from fractionation unit 29 is removed through line 37 to fractionation unit 38 for further separation. As an alternative method this material instead of being passed to fractionation unit 38 may instead be passed back to propane deasphalting unit 10 through lines 37, 41, and 11 for treatment as described above. The material in fractionation unit 38 is separated into clean gas oil boiling in a range of 550 to 850° F. and an asphaltic residue boiling above 850° F. The clean gas oil fraction is removed through line 39 and may be passed through line 16 to catalytic cracking unit 18, or if desired, through line 40 to a thermal cracking unit not shown. Asphaltic residue from fractionation unit 38 is removed through line 42 and passed through line 23 to hydrogenolysis unit 24.

Additional advantages of my invention are illustrated in the following example. The reactants and their proportions, and other specific ingredients and conditions are presented as being typical and should not be construed to limit the invention unduly.

Western Kansas topped crude of 20.0° API gravity and 1028° F. mid-boiling point, comprising 30 volume per cent of the total crude, is charged to a propane deasphalting unit at a temperature of 160° F. where asphalt, color bodies, and other undesirable constituents are removed. A deasphalted oil of 24.5° API gravity and a mid-boiling point of 950° F. comprising 24 volume per cent of the total crude is recovered and charged to a catalytic cracking unit, along with a clean virgin gas oil in a ratio of 1:1 where it is contacted with a bauxite catalyst in a moving bed type process at a temperature of 925° F. and a pressure of 10 pounds per square inch. The mid-boiling point of the above 1:1 mixture is 800° F. as compared to the mid-boiling point of 950° F. of the deasphalted oil alone. A catalyst to oil ratio of 5:1 is used and a liquid volume conversion of 50 per cent is obtained. Yields from this cracking operation are shown in Table I.

TABLE I

*Products from catalytic cracking of heavy oils*

Heavy recycle gas oil:
| | |
|---|---|
| Yield, volume per cent | 25 |
| Boiling range, °F. | 600–850 |
| Gravity, °API | 25.0 |
| Sulfur, weight per cent | 0.4 |

Light gas oil:
| | |
|---|---|
| Yield, volume per cent | 20 |
| Boiling range, °F. | 400–600 |
| Gravity, °API | 26.5 |

Gasoline, $C_5$–400° F., E. P.:
| | |
|---|---|
| Yield, volume per cent | 40 |
| Gravity, °API | 56.0 |
| Octane No. clear | 81.5 |

Gas: yield, volume per cent ___ 15

Heavy refractory recycle gas oil from the previously described cracking step and asphaltic residue from the propane deasphalting unit are introduced to a hydrogenolysis unit in a liquid volume ratio of oil to asphalt of 2:1. Hydrogen in the amount of 2000 cubic feet per barrel of charge stock is also introduced. Space velocity of the charge stock is 1 liquid volume of charge per volume of catalyst per hour. Destructive hydrogenation of the charge stock takes place in contact with a molybdenum trioxide on alumina gel catalyst at a temperature of 865° F. and a pressure of 3500 pounds per square inch. A naphtha product boiling within the range of $C_5$ to 550° F. is recovered and is then thermally reformed producing $C_5$–400° F., E. P. gasoline, 400 to 600° F. light gas oil, 600 to 850° F. heavy gas oil, and 850° F.+ residue. A clean gas oil hydrogenolysis product boiling between 550 and 850° F. is separated and passed to the catalytic cracking step where it is treated with the deasphalted oil and virgin gas oil to produce greater quantities of gasoline and gas oil suitable for Diesel fuel or further cracking into gasoline.

Advantages of this invention include obtaining maximum quantities of gasoline of improved octane number along with easily refined gas oil. Further, less equipment is required for the operation of this combined process than is necessary if the heavy refractory gas oil is destructively hydrogenated in a separate unit, thus realizing greater economy of operation.

Although this process has been described and exemplified in terms of its preferred modifications, it is understood that various changes may be made without departing from the spirit and scope of the disclosure and the claim.

I claim:

A combination process for up-grading asphaltic residue and heavy oil simultaneously, which comprises liquid phase propane deasphalting a dirty topped crude oil which boils above 800° F., recovering a clean asphalt free heavy oil which is catalytically cracked over a suitable catalyst in admixture with a virgin gas oil boiling in the range of 550 to 800° F., separating the effluent from said catalytic cracking into gas, gasoline, light gas oil, and heavy refractory gas oil, subjecting dirty asphaltic materials boiling above 1000° F. separated from said heavy oil in said propane deasphalting along with said heavy refractory gas oil from said catalytic cracking to destructive hydrogenation in the presence of hydrogen and over a catalyst immune to sulfur poisoning, separating effluent from said destructive hydrogenation and recovering hydrogen which is recycled to said destructive hydrogenation, $C_1$ to $C_4$ hydrocarbons, naphtha, clean gas oil, and asphaltic residue, reforming said naphtha thereby producing gas, gasoline, gas oil, and residue, passing said clean gas oil from said destructive hydrogenation and said asphaltic residue from said destructive hydrogenation to said propane deasphalting, and recovering greater quantities of improved gasoline and gas oil as products of the process.

WILLIAM C. DOUCE.

REFERENCES CITED

The following references are of record in the file of this patent:

UNITED STATES PATENTS

| Number | Name | Date |
|---|---|---|
| 2,149,900 | Pier et al. | Mar. 7, 1939 |
| 2,205,434 | Phinney | June 25, 1940 |
| 2,228,510 | Dearborn et al. | Jan. 14, 1941 |
| 2,247,535 | Voorhees | July 1, 1941 |
| 2,352,025 | Seguy | June 20, 1944 |

FOREIGN PATENTS

| Number | Country | Date |
|---|---|---|
| 389,113 | Great Britain | Mar. 6, 1933 |
| 834,748 | France | Nov. 30, 1938 |